United States Patent [19]

Gretz

[11] 4,194,768
[45] Mar. 25, 1980

[54] LIQUID-TIGHT CONNECTOR

[75] Inventor: Thomas J. Gretz, Stow, Ohio

[73] Assignee: The Scott & Fetzer Company, Bedford Heights, Ohio

[21] Appl. No.: 865,934

[22] Filed: Dec. 30, 1977

[51] Int. Cl.² ............................................. F16L 55/00
[52] U.S. Cl. .................................. 285/178; 285/247; 285/331; 285/359
[58] Field of Search ............... 285/248, 178, 331, 315, 285/359, 395, 396, 246, 247, 242, 245; 174/65 R, 65 SS

[56] References Cited

U.S. PATENT DOCUMENTS

| 1,588,606 | 6/1926 | Oden | 285/391 |
| 2,561,827 | 7/1951 | Soos | 285/248 |
| 2,853,320 | 9/1958 | Liebelt et al. | 285/247 |
| 3,075,792 | 1/1963 | Franck | 285/178 |
| 3,276,796 | 10/1966 | Daniel | 285/354 X |
| 3,747,964 | 7/1973 | Nilsen | 285/359 X |
| 3,836,700 | 9/1974 | Niemeyer | 285/248 |

Primary Examiner—Dave W. Arola
Attorney, Agent, or Firm—Pearne, Gordon, Sessions

[57] ABSTRACT

A resuable liquid-tight connector for flexible liquid-tight electrical conduit comprises a body member and a compression member which cooperate to simultaneously grip the conduit radially by means of an eccentric action and compress the conduit axially into a sealing seat by means of an axial camming action.

11 Claims, 10 Drawing Figures

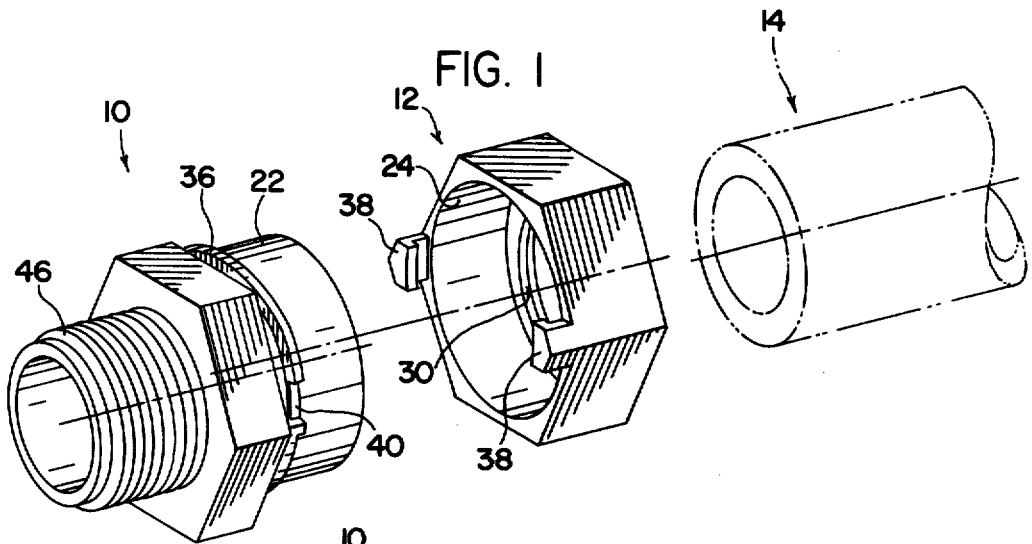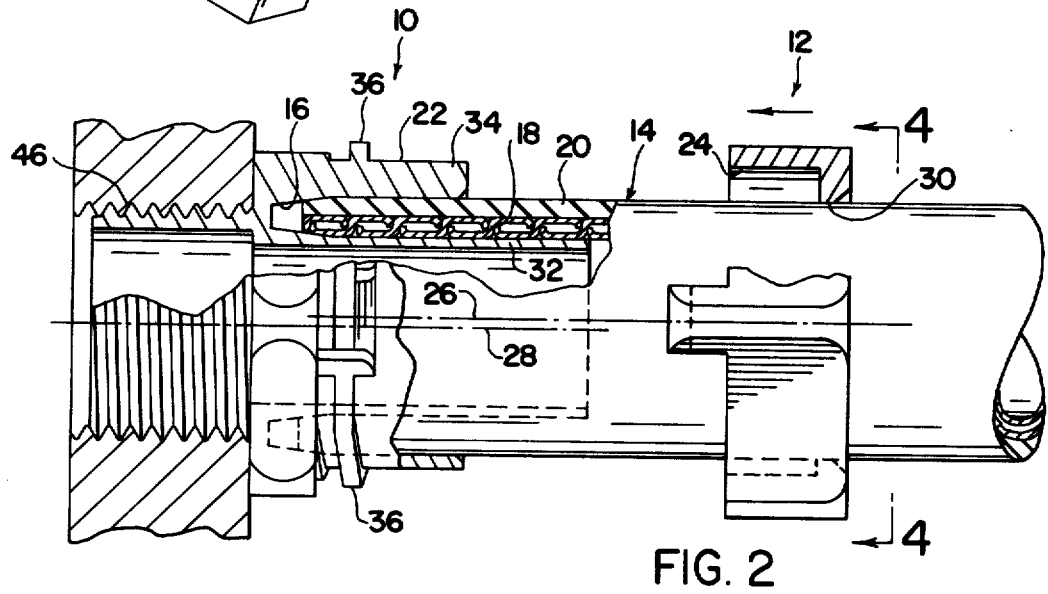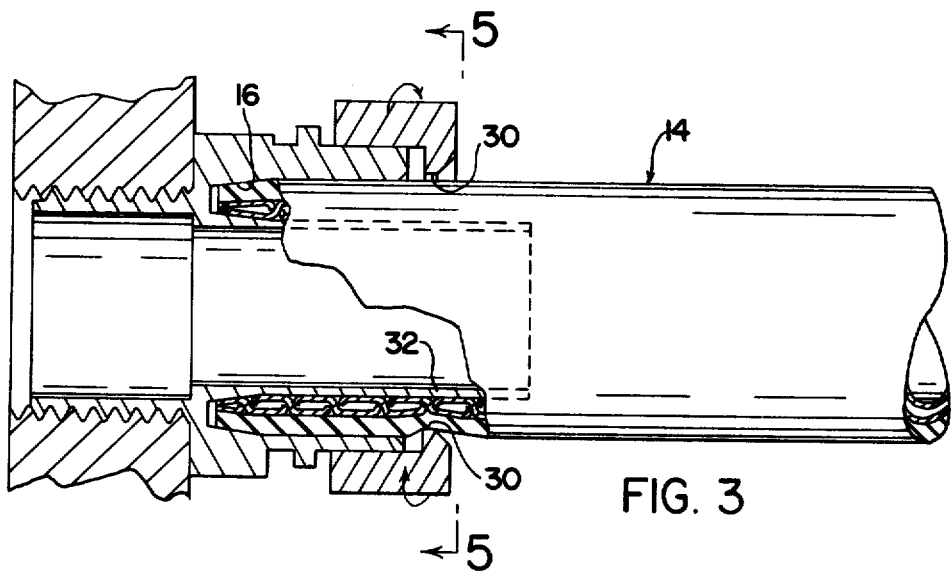

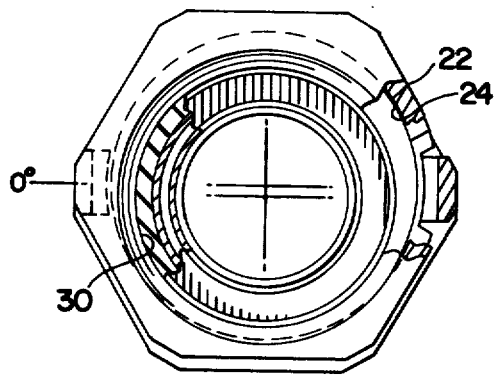
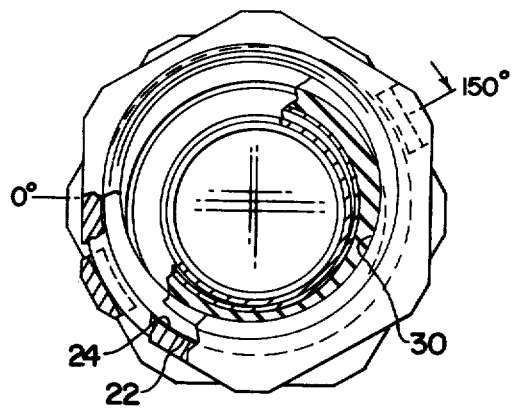
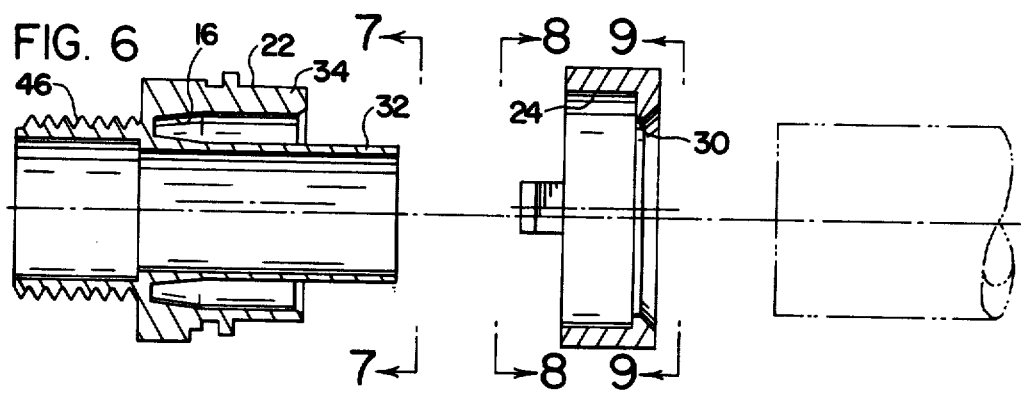
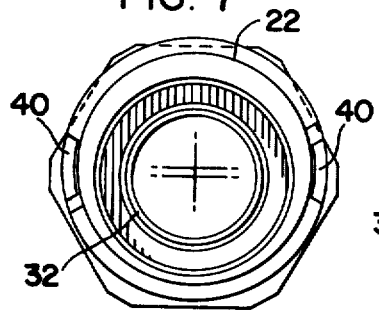
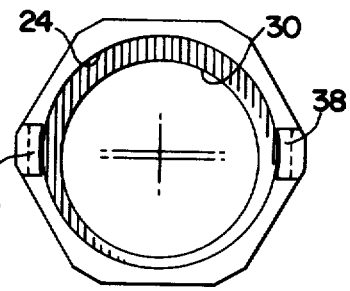
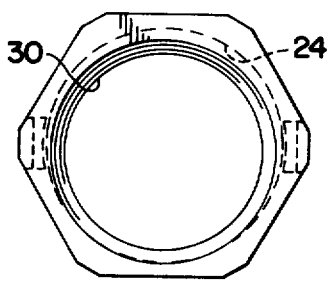
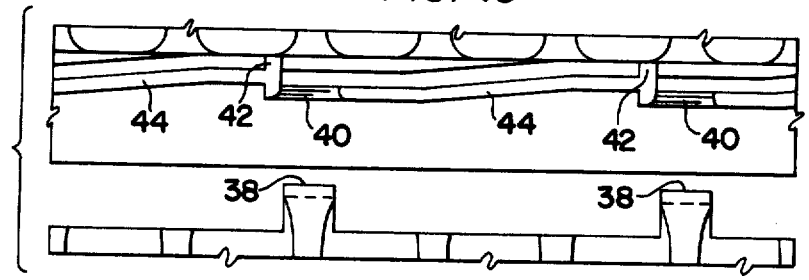

LIQUID-TIGHT CONNECTOR

This invention relates in general to electrical conduit fittings for making liquid-tight connections between electrical conduit of the liquid-tight type and an associated fixture such as a junction box, switchboard panel, piping or the like. Such conduit generally is provided with an external protective sheath which is resilient or yieldable.

Prior fittings have employed ferrules and/or glands and the like to achieve liquid-tight connections, as in U.S. Pat. Nos. 2,782,060 and 3,055,683 and in the fittings of Raco, a C.I.T. Company, Bridgeport Fittings Inc., and O. Z. Gedney unit of General Signal.

The need for products which will better meet the combined goals of simplicity, low manufacturing cost, ease of use, and reliability has been and is continually felt in the industry. The present invention represents a significant advance in these respects. It is simple, consisting of only two parts, with no ferrules, glands or the like. It can be manufactured by conventional high-volume manufacturing methods. It is easy and convenient to use and provides a firm and effective conduit seating and sealing action.

A particular advantage of the invention is that it may be reused without replacement of any parts. Liquid-tight connectors of the prior art generally cannot be reused without replacement of ferrules, glands or the like.

The objects and advantages of the invention will be more fully appreciated from the following description of a specific example.

In the accompanying drawings, FIG. 1 is an isometric view of a connector exemplifying the invention shown in unasembled condition and in association with the end of a conduit shown in phantom lines.

FIG. 2 is a side elevation of the same connection, partly broken away, showing the conduit seated in the body member but with the compression member withdrawn from the body member.

FIG. 3 is a side elevation of the same connection, partly broken away, showing the compression member tightened on the body member and in gripping engagement with the conduit.

FIGS. 4 and 5 are views, partly broken away, taken respectively on the planes of lines 4—4 and 5—5 in FIGS. 2 and 3.

FIG. 6 is a cross section similar to FIG. 2 but on a smaller scale and with the conduit omitted.

FIGS. 7, 8, and 9 are views taken respectively on the planes of lines 7—7, 8—8, and 9—9 in FIGS. 6 and 7.

FIG. 10 is a development of the camming flanges and lugs shown in the other views.

The illustrated connector includes a body member 10 and a compression member 12 adapted to receive a conduit 14. The body member 10 includes an annular seat which in the illustrated device is in the form of an annular groove 16 (FIGS. 2, 3, 6) which has tapered walls and which faces axially to receive the end of the conduit 14 as indicated in FIG. 2. The conduit may include an internal flexible metal wall 18 and an external protective sheath of elastomeric material 20. Axial compression of the end of the conduit 14 wedges the end into the groove 16 in liquid-tight relationship, as illustrated in FIG. 3.

Cooperating arcuate surfaces 22 and 24 are provided respectively on the body member and compression member. In the illustrated device these arcuate surfaces are cylindrical walls, the surface 22 forming a cylindrical boss and the surface 24 a cylindrical bore. The radial center or axis 26 (FIG. 2) of rotation of each of these surfaces is offset from the radial center or axis 28 of the annular seat 16. Accordingly, when the conduit 14 is received in the seat 16, the compression member 12 moves eccentrically with respect to the conduit when the compression member and body member are engaged and rotated relatively to each other. Two different relative positions of the parts are shown in FIGS. 2 and 3.

The compression member 12 includes a radially inwardly projecting circular flange 30. With the parts in the position shown in FIG. 2, the flange 30 freely receives the conduit 14. In the position of the parts shown in FIG. 3, one side of the flange 30 has moved radially inwardly with respect to the conduit to thereby grip the conduit wall against the conduit-supporting annulus 32, which forms an extension of the inner side of the annular seat or groove 16. As shown most clearly in FIG. 6, the annulus 32 extends axially beyond the outer part 34 of the body member 10 so that, as shown in FIG. 3, the support of the conduit 14 by the annulus 32 may extend to locations directly opposite the flange 30 whereby the flange 30 may firmly grip the conduit against the annulus 32.

Camming members are provided on one of the principal parts and cooperating cam followers on the other. In the illustrated embodiment, camming flanges 36 are provided on the body member 10 and cam lugs 38 on the compression member 12. The lugs 38 are accepted into engagement with the flanges 36 through gates 40 (FIGS. 1, 7, 10) in the manner of a bayonet connection. Travel of the lugs along the flanges 36 is limited by stops 42 (FIG. 10). Total relative angular movement between the body and compression members may be about 150 degrees, or slightly less than half a turn.

The development of the camming members is seen in FIG. 10. As the lugs 38 move up the sloped intermediate portions or ramps 44 of the camming flanges, the conduit 14 is urged from a loosely seated condition such as seen in FIG. 2 to the tightly seated condition shown in FIG. 3. The camming flanges and lugs together constitute a ramped bayonet connection which draws the members axially together as the connection is tightened.

The radial exterior of the compression member is preferably formed as the exterior envelope of a hexagonal unit, as shown. The cam lugs extend axially from one side of the exterior of the compression member and are within the exterior envelope of the hex nut shape, as shown. This helps protect the lugs against damage from sideward impacts. The radial exterior of the body member also includes a hex nut shape so that the two principal parts may be conveniently tightened down with wrenches.

The body member 10 includes a suitable means for engaging itself in liquid-tight relation with an associated fixture such as a junction box, panel, piping, or the like. This may comprise simply a threaded boss or end 46.

While a straight connector is shown, angled connectors may be provided. For example, the boss 46 may be replaced by a 45 degree or 90 degree threaded elbow. Appropriate commercial sizes of conduit with which the invention is usable include ⅜, ½, ¾, 1¼, 1½ and 2 inch sizes.

The invention is not limited to the precise details of the construction shown, but covers all variants based on the invention. For example, in a less preferred version of the invention, a camming flange may be provided on the compression member and cooperating lugs on the body member. The invention is defined by the following claims.

What is claimed is:

1. A liquid-tight connector for flexible liquid-tight electrical conduit, comprising a body member and a compression member, the body member having in its interior an annular seat for sealingly receiving the end of the conduit in liquid-tight relationship, said annular seat being in the form of an axially presented smooth-sided groove having axially extending sides including a radially inner side and a radially outer side for engaging respectively the radially inner and outer sides of said conduit end, the body member including means for engaging in liquid-tight relationship with an associated fixture, the body member and compression member together comprising both (1) the entire means for eccentrically asymmetrically gripping the conduit while the conduit end is positioned at the annular seat and (2) the entire means for axially compressing the conduit to wedge the eccentrically asymetrically gripped conduit end into liquid-tight engagement against the annular seat with the inner and outer sides of the conduit end being engaged respectively by the inner and outer sides of said axially presented smooth-sided groove, said means for radially gripping and said means for axially compressing being simultaneously responsive to relative rotation between the compression member and the body member.

2. A connector as in claim 1 in which full axial compression and full eccentric gripping are accomplished in substantially less than one full turn of relative rotation between the body member and the compression member.

3. A connector as in claim 1, said means for eccentrically gripping including cooperating arcuate surfaces on the body member and compression member having a common radial center which is offset from the radial center of the annular seat whereby the compression member moves eccentrically with respect to the conduit upon relative rotation between the body member and the compression member.

4. A connector as in claim 3, said means for eccentrically gripping further includes a circular radially inwardly projecting flange on said compression member movable from disengaged relationship to progressively tighter gripping relationship with the conduit during relative rotation in one direction.

5. A connector as in claim 3, said means for eccentrically gripping further including a conduit-supporting annulus projecting as an extension of the radially inner side of said axially presented smooth-sided groove to a point axially beyond radially exterior portions of said body member.

6. A connector as in claim 5, said means for eccentrically gripping further including a circular radially inwardly projecting flange on said compression member movable from nongripping relationship to progressively more tightly grip the conduit against the conduit-supporting annulus.

7. A connector as in claim 3, said means for axially compressing comprising external camming flanges on one of the members and cooperating external cam lugs on the other.

8. A connector as in claim 7, said camming flanges terminating in stops to limit relative rotation between the members to less than half a turn.

9. A connector as in claim 7, the radial exterior of said compression member being formed as the exterior envelope of a hexagonal nut with said cam lugs extending axially from one side of said radial exterior.

10. A connector as in claim 9, said lugs being generally within said exterior envelope and each extending along an apex of said envelope.

11. In a liquid-tight connector for flexible liquid-tight electrical conduit, a body member and a compression member, an annular seat in the interior of the body member for receiving the end of a conduit, said annular seat being in the form of an axially presented smooth-sided groove having axially extending sides including a radially inner side and a radially outer side for engaging respectively the radially inner and outer sides of said conduit end, a conduit-supporting annulus extending as an extension of the radially inner side of the seat and coaxially therewith to one end of the body member for receiving and supporting the portion of the conduit adjacent said end of the conduit, eccentric connection means between the body member and the compression member for moving the compression member from disengagement from the conduit to eccentric asymmetric, gripping engagement with the conduit against the conduit-supporting annulus upon relative twisting of the members with respect to each other, ramped bayonet connection means between the body member and the compression member for drawing the members axially together upon relative twisting of the members with respect to each other to thereby compress said conduit axially and wedge the conduit into liquid-tight engagement against the annular seat with the inner and outer sides of the conduit end being engaged respectively by the inner and outer sides of said axially presented smooth-sided groove, whereby relative twisting of the members with respect to each other both eccentrically asymmetrically grips the conduit and axially compresses the conduit to wedge it into liquid-tight engagement against said seat, the body member and compression member together comprising both (1) the entire means for accomplishing said eccentric, asymmetric gripping and (2) the entire means for accomplishing said wedging of the conduit into liquid-tight engagement.

* * * * *